(12) United States Patent
Taniguchi et al.

(10) Patent No.: US 6,415,685 B1
(45) Date of Patent: Jul. 9, 2002

(54) VEHICULAR AUTOMATIC TRANSMISSION

(75) Inventors: Takao Taniguchi; Kazumasa Tsukamoto; Masahiro Hayabuchi; Masaaki Nishida; Satoru Kasuya; Akitoshi Katou, all of Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/447,556

(22) Filed: Nov. 23, 1999

(30) Foreign Application Priority Data

Nov. 27, 1998 (JP) .......................................... 10-353908

(51) Int. Cl.[7] .............................................. F16H 57/02
(52) U.S. Cl. ...................................................... 74/606 R
(58) Field of Search ....................................... 74/606 R

(56) References Cited

U.S. PATENT DOCUMENTS

| 4,271,721 A | * | 6/1981 | Yamamori et al. .... 74/606 R X |
| 4,952,200 A | * | 8/1990 | Ohkawa ............... 74/606 R X |
| 4,994,007 A | | 2/1991 | Miura et al. |
| 5,570,605 A | * | 11/1996 | Kitagawara et al. .. 74/606 R X |
| 5,590,571 A | * | 1/1997 | Tsuji ........................ 74/606 R |
| 5,902,208 A | * | 5/1999 | Nakano ............... 74/606 R X |
| 6,110,070 A | * | 8/2000 | Nagai et al. ............. 74/606 R |

FOREIGN PATENT DOCUMENTS

JP 233564 * 10/1987 ............... 74/606 R

* cited by examiner

Primary Examiner—Chong H. Kim
(74) Attorney, Agent, or Firm—Oliff & Berridge, PLC

(57) ABSTRACT

An automatic transmission disposed in a case with a speed change mechanism disposed around an input shaft, a gear supported to a support wall of the case so as to transmit the output of the speed change mechanism to another shaft extending along the input shaft, and a rear cover portion integrated with the case, thereby eliminating a joint portion with the support wall supporting the gear removably attachable to the case through an opening portion.

13 Claims, 8 Drawing Sheets

FIG. 3

| | C-1 | C-2 | C-3 | B-1 | B-2 | F-1 | GEAR RATIO | STEP |
|---|---|---|---|---|---|---|---|---|
| P | | | | | | | | |
| REV | | | ○ | | ○ | | 3.389 | |
| N | | | | | | | | |
| 1ST | ○ | | | | (○) | ○ | 4.067 | ) 1.73 |
| 2ND | ○ | | | ○ | | | 2.354 | ) 1.51 |
| 3RD | ○ | | ○ | | | | 1.564 | ) 1.35 |
| 4TH | ○ | ○ | | | | | 1.161 | ) 1.35 |
| 5TH | | ○ | ○ | | | | 0.857 | ) 1.25 |
| 6TH | | ○ | | ○ | | | 0.684 | |

VEHICULAR AUTOMATIC TRANSMISSION

BACKGROUND OF THE INVENTION

1. Field of Invention

The invention relates to an automatic transmission installed in a vehicle and, more particularly, to a case structure that houses a speed change mechanism of the automatic transmission.

2. Description of Related Art

As one form of the vehicular automatic transmission, there exists an automatic transmission for a front-engine front-drive (FF) vehicle or a rear-engine rear-drive (RR) vehicle. This type of automatic transmission is normally connected in series to an engine between right and left side wheels of a vehicle in a transverse layout such that an axis of the automatic transmission extends parallel to an axle. Therefore, the type of automatic transmission normally adopts a three-axis transaxle construction in which a counter gear mechanism and a differential device are disposed in a single case.

In the three-axis automatic transmission, a counter drive gear for transmitting the output of a speed change device disposed on a main shaft to a counter shaft extending parallel to the main shaft is disposed on the main shaft. Since the counter drive gear transmits large torques produced through speed reductions, it is a normal practice to adopt a construction in which the counter shaft is firmly supported at its center axis to the case. If the counter drive gear is disposed in an intermediate portion of the speed change mechanism, the counter drive gear is supported to a center support that is provided integrally with the case. As an automatic transmission employing the aforementioned supporting method, there is a technology disclosed in U.S. Pat. No. 4,994,007. In this technology, an intermediate portion of a case in a direction along an axis of the case is provided with a support wall extending from a peripheral wall of the case radially inwards. Therefore, in order to assemble a speed change mechanism into the case, the technology adopts a construction in which both a front end portion and a rear end portion of the case have openings, and the opening of the rear end portion is covered with a rear case after the component parts of a rearward half portion of the speed change mechanism have been assembled.

However, if the case body and the rear case are separately provided as in the above-described conventional art, the joint portions of the two case parts need to have thick-walled portions through which fixing devices such as bolts or the like are inserted. The thick-walled portions cannot be protruded to an immediate vicinity of peripheral walls of members of a speed change mechanism or protruded inwardly from a peripheral wall of the case disposed on the peripheral walls, so that the thick portions are protruded outwardly of the outer periphery of the case.

In a typical automatic transmission, a valve body for controlling the speed change mechanism is mounted on the cases so as to extend in parallel to the speed change mechanism. The thick wall portions protruded outwardly from the case as described above, become obstacles against the valve body. The length of the valve body is limited to such a length relative to the entire length of the case that the valve body is disposed inwardly of the joint portions. The area is correspondingly limited. As the area of the valve body decreases, the thickness increases. Therefore, there occur problems in securing a minimal ground clearance of the vehicle and interference with other auxiliary devices.

SUMMARY OF THE INVENTION

The invention provides a case structure of an automatic transmission, wherein a rear case may be formed together with a case body so that a valve body mounting face can be secured substantially throughout the entire length of the case.

To achieve the aforementioned, the invention may provide a vehicular automatic transmission including a case, a speed change mechanism disposed around an input shaft, a gear for transmitting an output of the speed change mechanism to a shaft extending along the input shaft, and a support wall attached to the case and supporting the gear. The case may have, at one end of the case, a rear cover portion formed integrally with the case, and may have at another end of the case an opening portion. The support wall may be removable from the case via the opening portion.

The vehicular automatic transmission of the invention allows the support case needed for the speed change mechanism to be disposed in the case and, at the same time, adopts integration of a rear case portion with the case and thereby eliminates a protrusion of a joint portion radially outward relative to the case. Therefore, it becomes possible to secure a valve body-disposing surface substantially throughout the entire length of the case. Hence, restrictions of the area of the valve body can be eliminated.

In the vehicular automatic transmission, a construction may also be adopted wherein the case has, at a mounting position of the support wall and a position of the opening portion, end surfaces that face toward the opening portion and that are shifted from each other in position in a circumferential direction. The support wall may be provided with a protruded portion that can be moved past an end surface of the opening portion of the case and that contacts an end surface provided at the mounting position of the support wall. The support wall may be fixed to the case, with the protruded portions set into contact with the end surface at the mounting position. The opening portion of the case may be closed by a cover that is placed in contact with the end surface of the opening portion and fixed the end surface to cover the opening portion.

The above-described construction makes it possible to place the support wall into the case while disposing the end surface for fixing the support wall to the case and the end surface for fixing the cover for closing the case opening to the case, in portions having substantially equal diameters, since the end surfaces are shifted from each other in the circumferential directions relative to the case. Therefore, it becomes unnecessary to expand the outside diameter of the opening portion side of the case in order to place the support wall. Hence, the outside diameter thereof can be reduced, so that not only the length in the directions of the axis of the case for disposal of the valve body, but also an installation space, can be secured.

Another construction may also be adopted wherein the case has spline teeth that extend in an inner periphery of a peripheral wall of the case in a direction of an axis thereof so as to support a friction member of a brake of the speed change mechanism in such a manner that the friction member is stopped from turning. The spline teeth include short spline teeth that terminate at the mounting position of the support wall and long spline teeth that extend to and terminate at the opening portion of the case. The support wall has an outside diameter portion whose diameter is smaller than a diameter of an inner periphery defined by the long spline teeth, and a protruded portion that protrudes from the outside diameter portion so that the protruded portion can pass through a space between the long spline teeth and can contact an end surface of at least one of the short spline teeth. The support wall may be fixed to the case, with the protruded portion stopped by the end surface of the at least one of the short spline teeth. The opening portion of the case may be closed by a cover that is stopped by and fixed to an end surface of at least one of the long spline teeth to cover the opening portion.

In the above-described construction, the end surface for fixing the support wall to the case and the end surface for fixing the cover for closing the case opening to the case are formed by utilizing the end surfaces of the spline teeth provided for the brake of the speed change mechanism. Further, the inter-teeth spaces between the spline teeth are utilized as insert spaces for bringing the support wall through the opening portion. Therefore, it becomes possible to place the support wall by utilizing the spaces needed for placing and supporting a friction member of the brake of the speed change mechanism, thereby eliminating the need to increase the size of the case for placement of the support wall. Therefore, this construction also makes it unnecessary to expand the outside diameter of the opening portion side of the case in order to place the support wall. Hence, the outside diameter thereof can be reduced, so that not only the length in the directions of the axis of the case for disposal of the valve body, but also an installation space, can be secured.

In the above-described construction, it is also possible to adopt a construction wherein the support wall has an annular protrusion that is fittable to an inner periphery defined by the spline teeth of the case.

In this construction, the support wall can be centered and positioned to the case by fitting the annular protrusion of the support wall to the inner periphery defined by the spline teeth of the case. Therefore, it becomes possible to achieve reliable concentricity of the gear supported by the support wall relative to the input shaft.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein:

FIG. 3 is a table showing operation of the aforementioned transmission, and gear ratios and gear ratio steps thereby achieved;

DETAILED DESCRIPTION OF PREFERRED EMBODIMENTS

Figure 1:
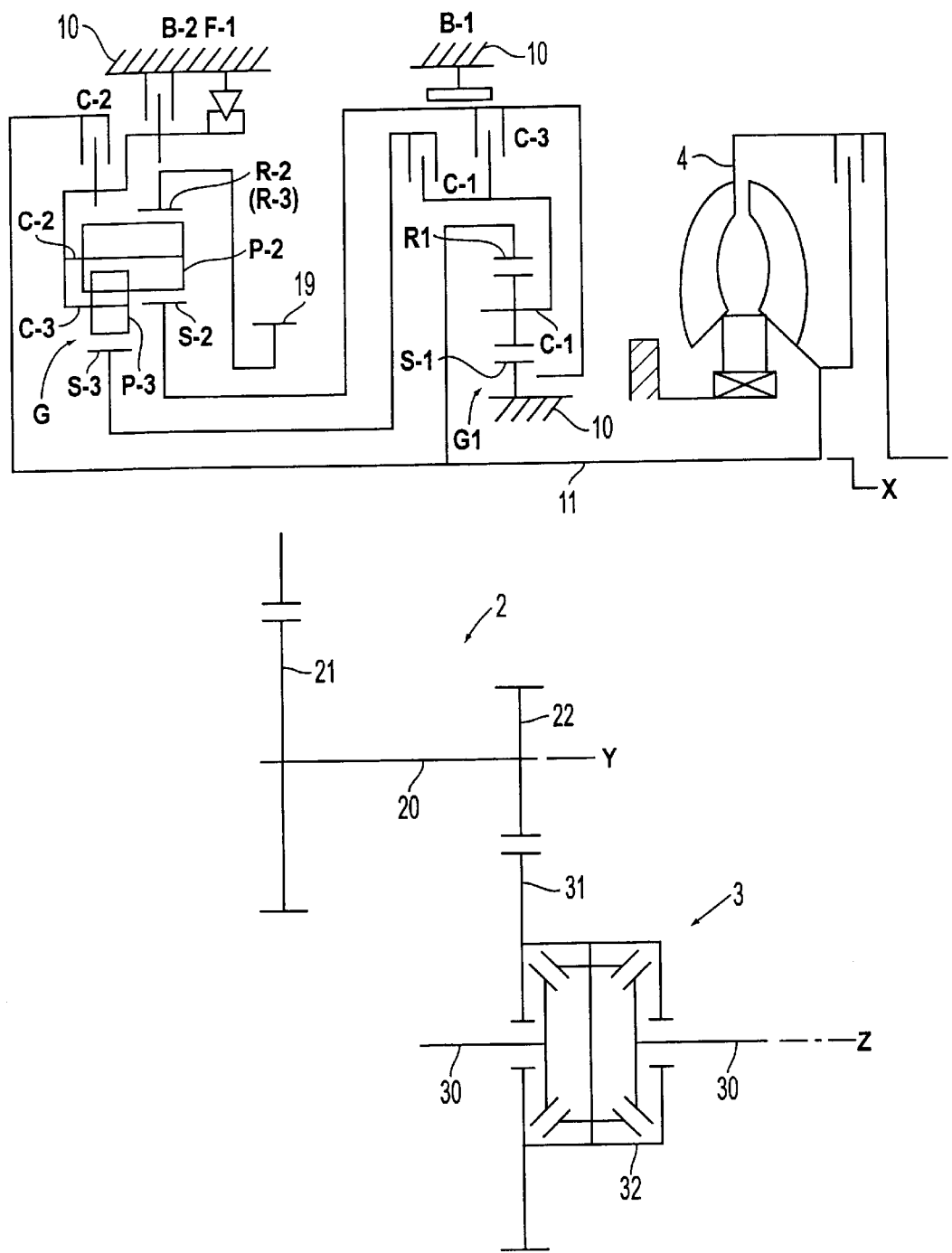
FIG. 1 is a skeleton diagram in which a speed change mechanism according to an embodiment of the vehicular automatic transmission of the invention is developed.
Figure 2:
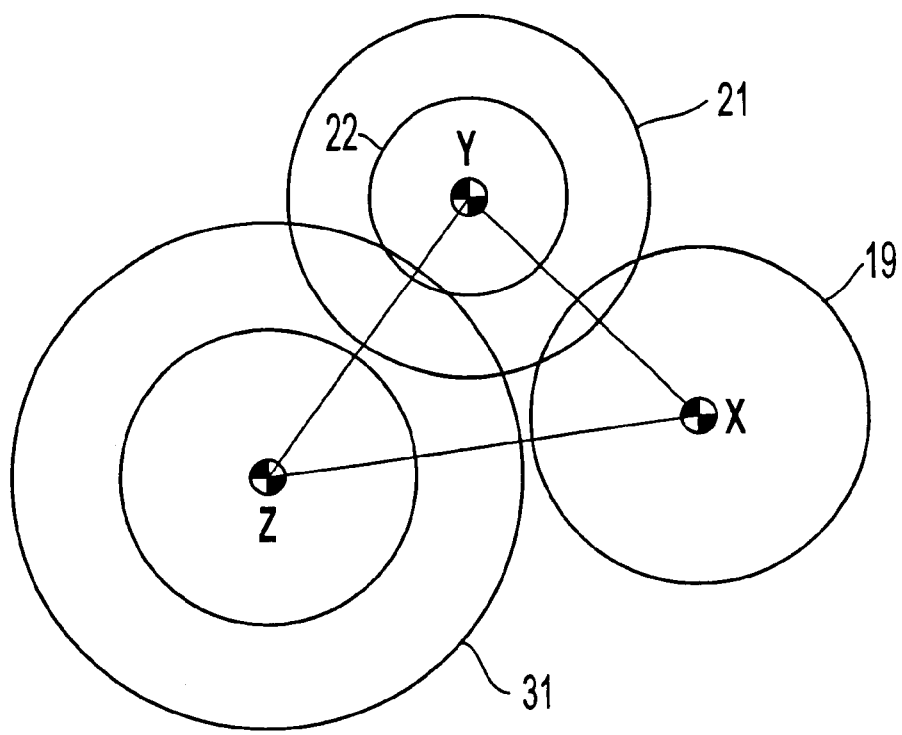
FIG. 2 is a view of ends in a direction of an axis, illustrating an actual positional relationship of three axes in the transmission shown in FIG. 1.

A preferred embodiment of the invention will be described hereinafter with reference to the accompanying drawings. Prior to description of a transmission case, that is, a subject of the invention, an overall construction of a gear train related to a specific construction of the case will be described. FIG. 1 illustrates in a skeleton diagram a gear train in an embodiment of a vehicular automatic transmission in which the invention is embodied, wherein configurations between shafts are developed into a single plane. FIG. 2 indicates an actual shaft position relationship in the aforementioned automatic transmission viewed from an end face. The automatic transmission has a three-axis construction in which a main axis X, a counter axis Y, and a deferential axis Z extend parallel to one another and various elements are disposed on each shaft. Disposed around an input shaft 11 of the main axis X is a speed change mechanism including a planetary gear set G having four speed change elements S2, S3, C2(C3), R2(R3), a speed-reducing planetary gear G1, two brakes B-1, B-2, and three clutches C-1, C-2, C-3.

In this automatic transmission, a small-diameter sun gear S3 of the planetary gear set G is connected to the input shaft 11 by the clutch C-1 via the speed-reducing planetary gear G1. A large-diameter sun gear S2 is connected to the input shaft 11 by the clutch C-3 via the speed-reducing planetary gear G1. The large-diameter sun gear S2 can be stopped relative to a case 10 by a brake B-1. A carrier C2(C3) is connected to the input shaft 11 by the clutch C-2, and can be stopped relative to the case 10 by a brake B-2. A ring gear R2(R3) is connected as an output element to a counter drive gear 19. In the gear train shown in FIG. 1, a one-way clutch F-1 is disposed on a side of the brake B-2. The one-way clutch F-1, which automatically releases its engaging force as the brake B-1 engages, is employed in order to avoid a complicated hydraulic control for the engagement switching between the brake B-2 and the brake B-1 at the time of a 1-to-2 speed shift described in detail below and to simplify a release control of the brake B-2. The one-way clutch F-1 is equivalent to the brake B-2.

The gear train of this embodiment will next be further described in detail. Disposed on the main axis X is a lockup clutch-equipped torque converter 4 that transmits rotation from an engine (not shown) to the input shaft 11. A counter gear 2 is disposed on the counter axis Y. The counter gear 2 includes a large-diameter counter driven gear 21 fixed to a counter shaft 20 and meshed with the counter drive gear 19, and a differential drive pinion gear 22 fixed to the counter shaft 20 and meshed with a differential ring gear 31. With these elements, the counter gear 2 performs the function of reducing the speed of the output from the side of the main axis X, and reversing and transmitting the output to a differential device 3. The differential device 3 is disposed on the deferential axis Z. The differential device 3 has a differential case 32 fixed to the differential ring gear 31. Differential rotations produced by differential gears disposed in the differential case 32 are outputted to right and left shafts 30, thereby providing final wheel drive forces.

The planetary gear set G is formed by a Ravigneaux type gear set including the two sun gears S2, S3 having different diameters, and the carriers C2(C3) supporting two pinion gears P2, P3 meshed with each other, one of the two pinion gears being meshed with the large-diameter sun gear S2 and the ring gear R2(R3), and the other being meshed with the small-diameter sun gear S3.

In the speed-reducing planetary gear G1, the sun gear S1 is fixed to the transmission case 10, and the ring gear R1 is connected as an input element to the input shaft 11, and the carrier C1 is connected as an output element to the planetary gear set G via the clutch C-1 and the clutch C-3. The small-diameter sun gear S3 of the planetary gear set G is connected to the clutch C-1, and the large-diameter sun gear S2 is connected to the clutch C-3, and can be stopped relative to the automatic transmission case 10 by the brake B-1 formed by a hand brake. The carrier C2(C3) is connected to the input shaft 11 via the clutch C-2, and can be stopped relative to the transmission case 10 by the brake B-2, and can be stopped from rotating in one direction relative to the transmission case 10 by the one-way clutch F-1. The ring gear R2(R3) is connected to the counter drive gear 19.

Figure 4:
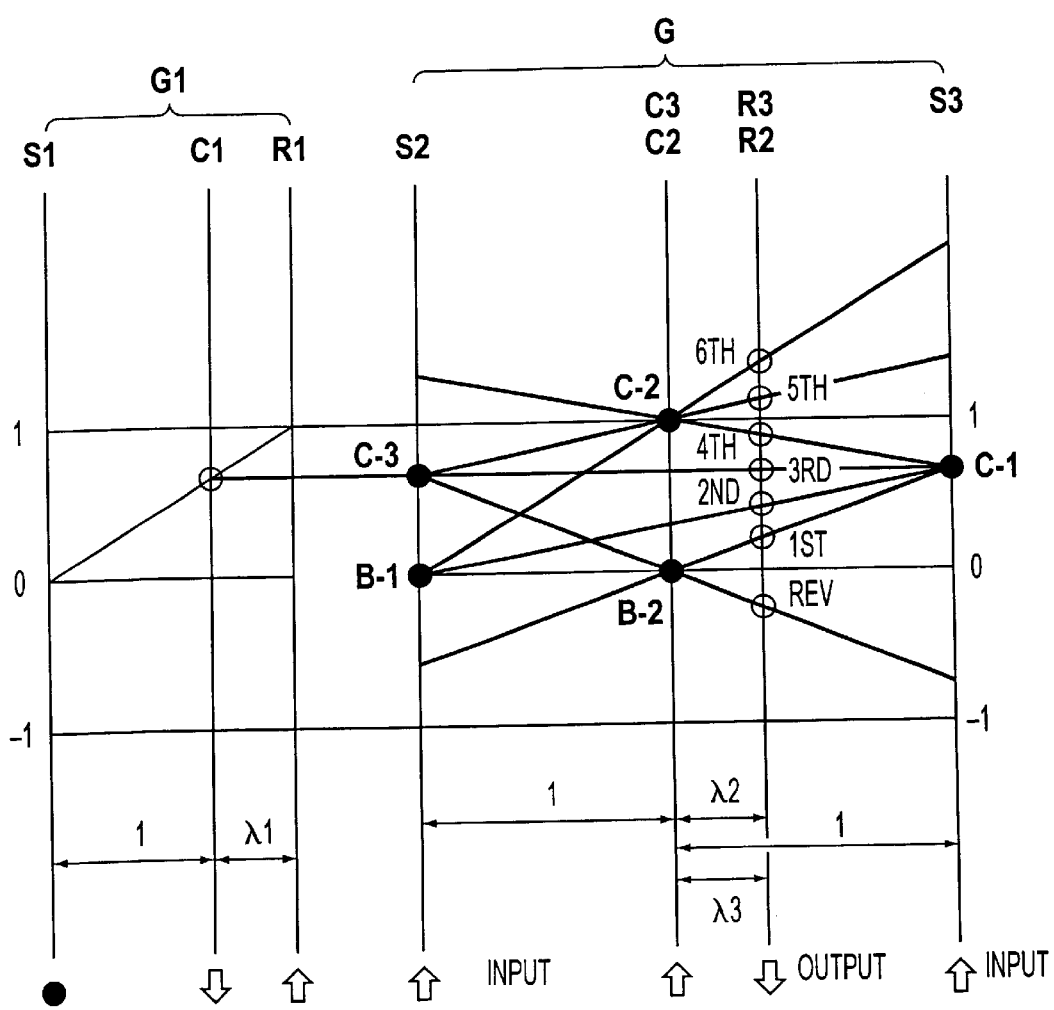
FIG. 4 is a speed diagram of the transmission.

The thus-constructed automatic transmission shifts the gear speed based on a vehicle load and a vehicle speed within a gear speed range in accordance with a select range selected by a driving person, under control by an electronic control unit and a hydraulic control unit that are not shown. FIG. 3 shows a table of gear speeds achieved by engagement and disengagement of the individual clutches and brakes (Marking with • indicates engagement, and no-marking indicates disengagement.). FIG. 4 is a speed diagram indicating gear speeds achieved by engagement of the individual clutches and brakes (Marking with • indicates engagement thereof) and the rotational speed ratio of the individual speed-changing elements.

As can be seen with reference to the two drawings, the first speed (1ST) is achieved by the engagement of the clutch C-1 and the brake B-2 (In this embodiment, the engagement of the brake B-2 is replaced by the automatic engagement of the one-way clutch F-1 as can be seen from the table of operation. The reasons for employing the engagement of this element and for the correspondence of the engagement of this element to the engagement of the brake B-2 will be explained below). In this case, after being speed-reduced through the input shaft 11 and the speed-reducing planetary gear G1, rotation is input to the small-diameter sun gear S3 via the clutch C-1. With reaction force from the carrier C3 stopped by the engagement of the one-way clutch F-1, speed-reduced rotation of the maximum speed-reduced ratio of the ring gear R3 is outputted to the counter drive gear 19.

Next, the second speed (2ND) is achieved by the simultaneous engagement of the clutch C-1 and the brake B-1. In this case, after being speed-reduced through the input shaft 11 and the speed-reducing planetary gear G1, rotation is input to the sun gear S3 via the clutch C-1. With reaction force from the large-diameter sun gear S2 stopped by the engagement of the brake B-1, the speed-reduced rotation of the ring gear R2(R3) is output to the counter drive gear 19. The speed reduction ratio in this case is smaller than that for the first speed (1ST) as can be seen in FIG. 4.

The third speed (3RD) is achieved by the engagement of the clutch C-1 and the clutch C-3. In this case, after being speed-reduced through the input shaft 11 and the speed-reducing planetary gear G1, rotation is input simultaneously to the large-diameter sun gear S2 and the small-diameter sun gear S3 via the clutch C-1 and the clutch C-3. The planetary gear set G is in a directly-connected state. Therefore, the rotation of the ring gear R2(R3) being the same as the input rotation to the two sun gears is outputted to the counter drive gear 19 as rotation whose speed has been reduced relative to the rotation of the input shaft 11.

The fourth speed (4TH) is achieved by the simultaneous engagement of the clutch C-1 and the clutch C-2. In this case, rotation, having been speed-reduced through the input shaft 11 and the speed-reducing planetary gear G1, is input to the sun gear S3 via the clutch C-1, and non-speed-reduced rotation, having been input from the input shaft 11 via the clutch C-2, is inputted to the carrier C3. Rotation corresponding to an intermediate point between the two input rotations is output to the counter drive gear 19 as rotation of the ring gear R3 that is slightly speed-reduced in comparison with the rotation of the input shaft 11.

The fifth speed (5TH) is achieved by the simultaneous engagement of the clutch C-2 and the clutch C-3. In this case, rotation, having been speed-reduced through the input shaft 11 and the speed-reducing planetary gear G1, is input to the sun gear S2 via the clutch C-3, and non-speed-reduced rotation, having been input from the input shaft 11 via the clutch C-2, is input to the carrier C2. Rotation of the ring gear R2 whose speed has been slightly increased from the speed of rotation of the input shaft 11 is output to the counter drive gear 19.

The sixth speed (6TH) is achieved by the engagement of the clutch C-2 and the brake B-1. In this case, non-speed-reduced rotation is inputted from the input shaft 11 only to the carrier C2 via the clutch C-2. With reaction force from the sun gear S2 stopped by the engagement of the brake B-1, rotation of the ring gear R2 is speed-increased, and then output to the counter drive gear 19.

The reverse (REV) is achieved by the engagement of the clutch C-3 and the brake B-2. In this case, after being speed-reduced through the input shaft 11 and the speed-reducing planetary gear G1, rotation is input to the sun gear S2 via the clutch C-3. With reaction force from the carrier C2 stopped by the engagement of the brake B-2, reverse rotation of the ring gear R2 is output to the counter drive gear 19.

The aforementioned relationship between the one-way clutch F-1 and the brake B-2 will be described. As in the engagement-disengagement relationship between the two brakes B-1, B-2 at the time of the first speed and the second speed, the two brakes serve as friction elements that are engagement-switched in a general term during the up or down-shift between the two gear speeds, that is, engagement of one of the two brakes and disengagement of the other are simultaneously performed during the shift. The engagement switching between friction elements as described above needs high-precision simultaneous control of the engaging pressure and the disengaging pressure of hydraulic servos that operate the friction elements. Realization of such control requires addition of a control valve for the control, complication of a hydraulic circuit, or the like. Therefore, utilizing the fact that the reaction torque occurring to the carrier C2(C3) is reversed when the gear speed is shifted between the first speed and the second speed, this embodiment employs a setting in which the engaging direction of the one-way clutch F-1 is conformed to the reaction torque supporting direction at the time of the first speed, so that the one-way clutch F-1 performs substantially the same function as the engagement of the brake B-2. Thus, at the time of the first speed, the one-way clutch F-1 stops the carrier C2(C3), instead of the engagement of the brake B-2. In a wheel-drive vehicle coast state, however, the direction of reaction torque on the carrier C2 (C3) is reversed relative to the state of the engine drive, so that the engagement of the brake B-2 is needed as indicated by the parenthesized mark "O" in FIG. 3 in order to achieve an engine brake effect.

The gear speeds achieved as described above have good speed steps with relatively constant intervals between the gear speeds, as can be qualitatively seen from the vertical intervals between marks "O" indicating speed ratios of the ring gears R2, R3 in the speed diagram of FIG. 4. If this relationship is quantitatively expressed with specific values being set, the gear ratios as shown in FIG. 3 are obtained. The gear ratios in this case become as follows. That is, if the number of teeth ratio $\lambda 1$ between the sun gear S1 and the ring gear R1 of the speed-reducing planetary gear G1 is set as $\lambda 1=44/78$, the number of teeth ratio $\lambda 2$ between the sun gear S2, that is, the large-diameter sun gear, and the ring gear R2(R3) of the planetary gear set G is set as $\lambda 2=36/78$, and the number of teeth ratio $\lambda 3$ between the sun gear S3, that is, the small-diameter sun gear, and the ring gear R3 is set as $\lambda 3=30/78$, then the input-output gear ratio becomes as follows.

The first speed (1ST): $(1+\lambda 1)/\lambda 3=4.067$

The second speed (2ND): $(1+\lambda 1)(\lambda 2+\lambda 3)/\lambda 3(1+\lambda 1)=2.354$ The third speed (3RD): $1+\lambda 1=1.564$ The fourth speed (4TH): $(1+\lambda 1)/(1+\lambda 1-\lambda 1\cdot\lambda 3)=1.161$ The fifth speed (5TH): $(1+\lambda 1)/(1+\lambda 1+\lambda 1\cdot\lambda 2)=0.857$ The sixth speed (6TH): $1/(1+\lambda 2)=0.684$ The reverse (REV): $-(1+\lambda 1)/\lambda 2=3.389$ The steps between the gear ratios are as follows.

Between the first and second speeds: 1.73

Between the second and third speeds: 1.51

Between the third and fourth speeds: 1.35

Between the fourth and fifth speeds: 1.35

Between the fifth and sixth speeds: 1.25

As is apparent from the foregoing description of the gear train, torque produced through the speed reduction and the corresponding amplification achieved by the speed-reducing planetary gear G1 is inputted to the planetary gear set G in this transmission, so that a size increase of the planetary gear set G itself and corresponding size increases of various component members, are inevitable. A gear train construction as described above is employed in order to reduce manly the axial length of the speed change mechanism by contriving the arrangement of members despite side increases of the members.

Figure 6:
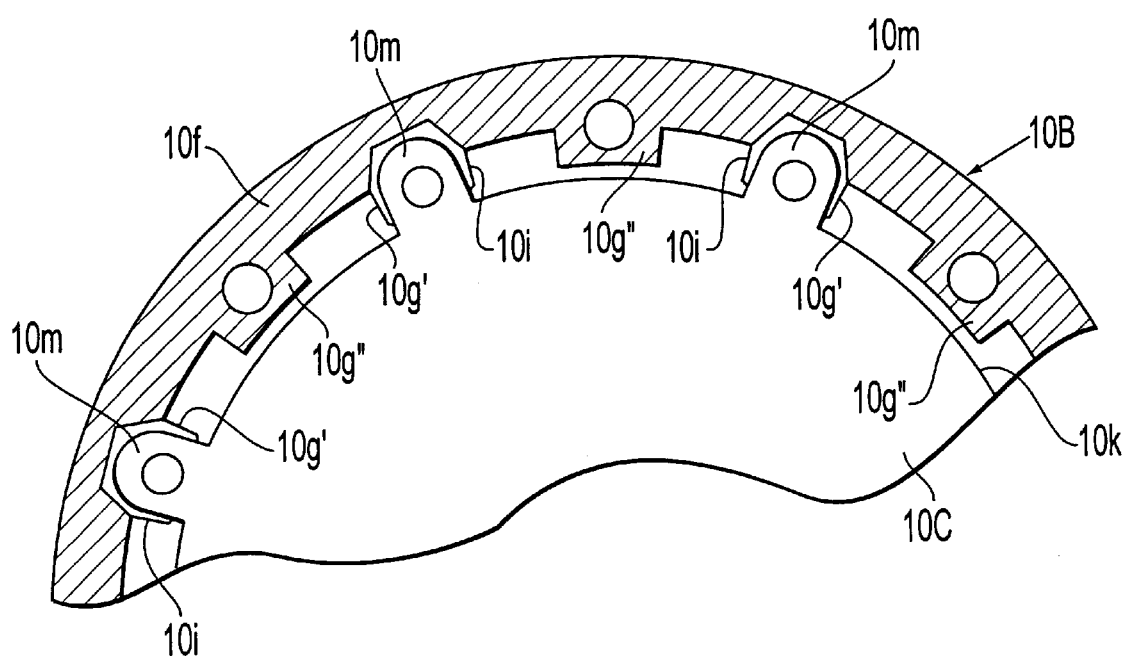
FIG. 6 is a sectional view taken on line 6—6 in FIG. 5.
Figure 7:
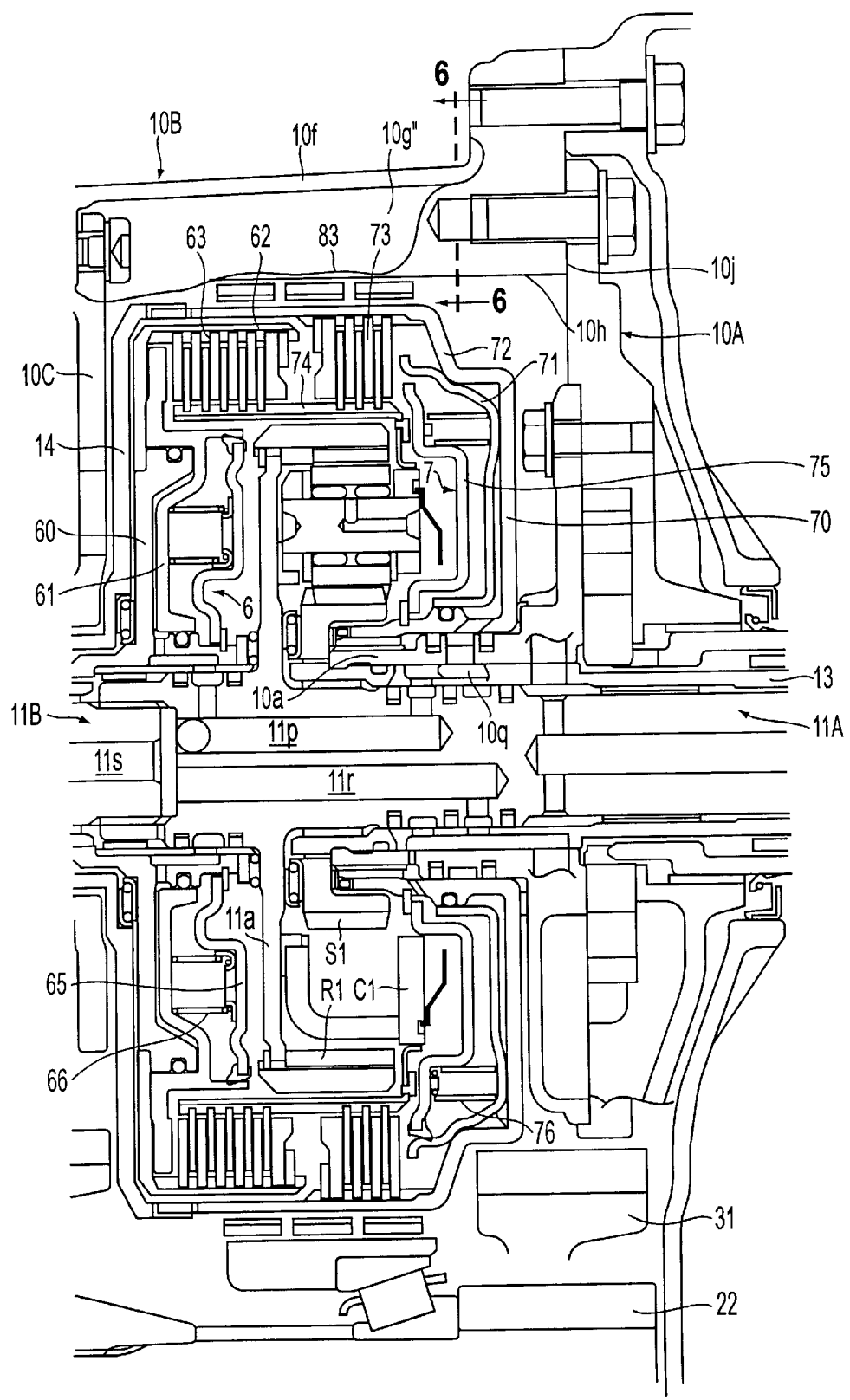
FIG. 7 is an enlarged sectional view illustrating a forward half of a main axis portion of the transmission.
Figure 8:
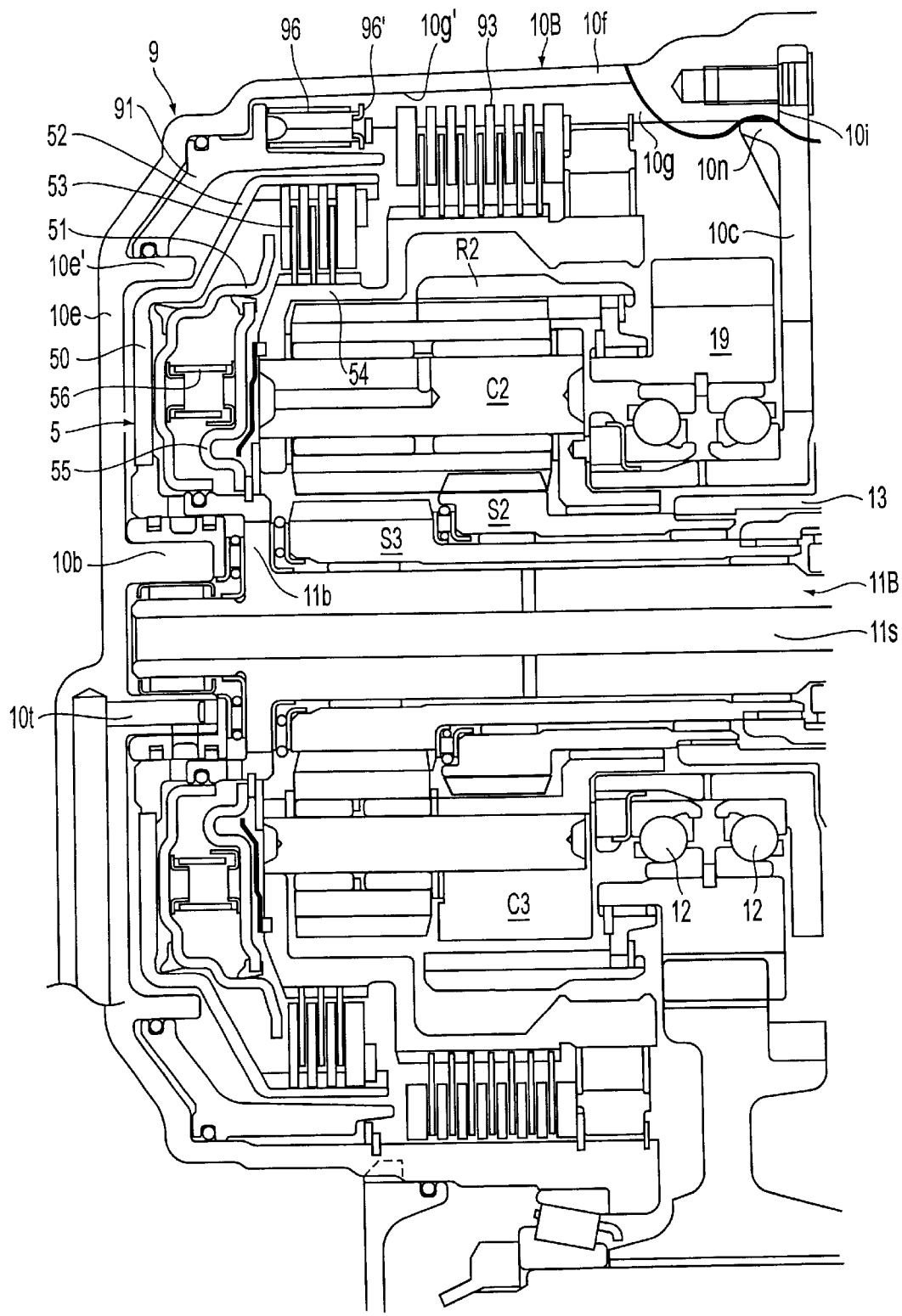
FIG. 8 is an enlarged sectional view illustrating a rearward half of the main axis portion of the transmission.

The construction of portions and the arrangement of members will be described in detail with reference to an overall sectional view in FIG. 5, a 6—6 section in FIG. 6, and enlarged fragmentary sectional views in FIGS. 7 and 8. In this specification, the terms "clutch" and "brake" collectively refer to friction members and hydraulic servos. Therefore, the clutch C-1 is formed by a friction member 63 and a hydraulic servo 6. Similarly, the clutch C-2 is formed by a friction member 53 and a hydraulic servo 5, and the clutch C-3 is formed by a friction member 73 and a hydraulic servo 7. In addition, the brake B-1 is formed by a band 83 and a hydraulic servo (not shown), and the brake B-2 is formed by a friction member 93 and a hydraulic servo 9.

According to the subject of the invention, a case 10B that houses the speed change mechanism has a rear end wall portion 10e formed integrally at one end of the case 10B as a rear cover portion, and a peripheral wall portion 10f whose diameter increases with forward progress from the rear end wall portion 10e, and an opening 10h at the other end. Formed in an inner peripheral surface of the peripheral wall portion 10f of the main body 10B are a plurality of spline teeth 10g extending substantially from the rear end wall portion 10e to the front-end opening 10h. Formed in the rear end wall portion 10e are a rearward boss portion 10b protruded forward from the rear end wall portion so as to support a rear end of the input shaft 11, and an annular wall 10e' that forms an inner peripheral wall of a cylinder of the hydraulic servo of the brake B-2 described in detail below. A support wall 10C for supporting the counter drive gear 19 is provided in a substantially central portion of the case 10B in the direction of the axis, in such a manner that the support wall 10C can be removed from the case 10B via the opening 10h.

The case 10B has, at the mounting position of the support wall 10C and the position of the opening portion 10h, end surfaces 10i, 10j that face toward the opening portion and that are shifted from each other in position in circumferential directions. As shown in FIG. 6, the support wall 10C is provided with protruded portions 10m that can be moved past the end surfaces 10j of the opening portion 10h of the case 10B and that contact the end surfaces 10i provided at the mounting position of the support wall 10C. The support wall 10C is fixed to the case 10B by using bolts, with the protruded portions 10m having been set into contact with the end surfaces 10i at the mounting position. The opening portion 10h of the case 10B is closed by a cover 10A that is placed in contact with the end surfaces 10j of the opening portion 10h and fixed thereto by bolts to cover the opening portion 10h. In this embodiment, the cover 10A is formed by an oil pump body and an oil pump cover fixed thereto. The cover 10A has a forward boss portion 10a that protrudes rearward from the oil pump cover.

More specifically, the case 10B has a plurality of spline teeth 10g that extend in the inner periphery of the peripheral wall 10f of the case 10B in the direction of the axis thereof so as to support the friction member 93 of the brake B-2 of the speed change mechanism in such a manner that the friction member 93 is stopped from turning. The spline teeth 10g include short spline teeth 10g' that terminate at the mounting position of the support wall 10C and long spline teeth 10g" that extend to and terminate at the opening portion 10h of the case 10B. The support wall 10C has an outside diameter portion 10k whose diameter is smaller than the diameter of an inner periphery defined by the long spline teeth 10g", and the protruded portions 10m that protrude from the outside diameter portion so that the protruded portions 10m can pass through spaces between the long spline teeth 10g" and can contact the terminal end surfaces 10i of the short spline teeth 10g'. The support wall 10C is fixed to the case with the protruded portions 10m stopped by the terminal end surfaces 10i of the short spline teeth 10g'. The opening portion 10h of the case 10B is closed by the cover 10A that is stopped by and fixed to the terminal end surfaces 10j of the long spline teeth 10g" to cover the opening portion 10h.

The support wall 10C has an annular protrusion 10n that can fit to the inner periphery of the spline teeth 10g of the case 10B. The annular protrusion 10n extends rearward from a wall surface of the support wall 10C in conformity to the outside diameter portion 10k, and is reinforced by radial ribs.

The input shaft 11 is divided into two shafts, that is, a forward shaft 11A, and a rearward shaft 11B, for convenience in processing. The two shafts 11A, 11B are joined together by spline engagement. Formed in the forward shaft portion 11A are a lubrication pressure supplying fluid passage 11r and a servo pressure supplying fluid passage 11p. A lubrication pressure fluid passage 11s is formed in the rearward shaft portion 11B. A flange 11a is formed on an outer periphery of a portion of the forward shaft portion 11A near a rear end of the forward shaft portion 11A. A flange 11b is formed on an outer periphery of a portion of the rearward shaft portion 11B near a rear end of the rearward shaft portion 11B. The forward shaft portion 11A is supported by a sleeve shaft fitted to the inner periphery of the forward boss portion 10a, via bushes disposed at a position inward of the placing position of the oil pump and a position immediately forward of the flange 11a. The rearward shaft portion 11B is supported in directions of the diameter thereof, at the forward end thereof, by the spline engagement with the forward shaft portion 11A and, at the rearward end, by a rearward boss portion 10b of the case 10 via a bearing. Support in directions of the axis thereof is accomplished by thrust bearings disposed between the flanges 11a, 11b formed adjacent to the aforementioned support portions and the distal ends of the boss portions.

The planetary gear set G is disposed on an outer periphery of the rearward shaft portion 11B of the input shaft 11. The sun gear S3 is supported at its two ends to the rearward shaft portion 11B via bushes disposed on a gear portion and an extended shaft portion of the sun gear S3. The sun gear S2 is supported at its two ends to the extended shaft portion of the sun gear S3 via bushes disposed on a gear portion and an extended shaft portion of the sun gear S2. The carrier C2(C3) is cantilever-supported at its forward end portion to the extended shaft portion of the sun gear S2 via a bush. The ring gear R2 is supported to the counter drive gear 19 by spline coupling using a flange member. The sun gear S2 of the planetary gear set G is coupled at its extended shaft portion to a drive force transmitting member 13 by spline engagement. The drive force transmitting member 13 is coupled to a drum 72 of the clutch C-3 by end face mesh. The sun gear S3 is coupled at its extended shaft portion to an extended portion of a cylinder 60 of a hydraulic servo of the clutch C-1 by spline engagement. The carrier C2(C3) is coupled to a member which is an integration of a hub of the brake B-2, and a hub 54 of the clutch C-2 fixed to the rear end of the carrier C2(C3) and extending forward at a side of an outer periphery of the planetary gear set G, and an inner lace of the one-way clutch F-1. Furthermore, the ring gear R2(R3) is coupled to the counter drive gear 19 via a coupling member as described above.

The speed-reducing planetary gear G1 is disposed forward of the speed change mechanism in a manner such that the sun gear S1, which is a reaction force element, is fixed by spline engagement to an rearward end portion of the sleeve shaft 13 fitted and fixed to the inner periphery of the forward boss portion 10a and fixing, at its forward end portion, a stator of the torque converter to the oil pump cover via a one-way clutch, and such that the ring gear R1, which is an input element, is coupled by spline engagement to an outer periphery of the flange 11 a of the input shaft 11. The carrier Cl, which is an output element, is fixed, at its forward end portion, to a below-described hub 74 common to the clutches C-1, C-3.

The hydraulic servos 6, 7 of the clutches C-1, C-3 are disposed on opposite sides of the speed-reducing planetary gear G1 so as to face each other in the front-rear directions. The hydraulic servo 6 of the clutch C-1 is formed by a cylinder 60 rotatably supported to the outer periphery of a rear end portion of the forward shaft portion 11A of the input shaft and having a drum 62 fixed to an outer peripheral side of the cylinder 60, a piston 61 slidably inserted in the cylinder 60, a cancel plate 65 for offsetting the centrifugal hydraulic pressure occurring on the back surface of the piston 61, and a return spring 66. The supply of servo pressure to and removal of servo pressure from the hydraulic servo is performed via the in-shaft fluid passage 11p of the forward shaft portion 11A.

The hydraulic servo 6 of the clutch C-1 is a member that is disposed at an inner peripheral side of the friction member 63 of the clutch, and that brings about spline engagement with the extended shaft portion of the sun gear S3 of the planetary gear set G to transmit drive force from the drum 62 of the clutch C-1 to the sun gear S3 of the planetary gear set G. The hydraulic servo 6 is supported to the input shaft at an inner peripheral side of the support wall 10C serving as a member supporting the counter drive gear 19 for transmitting output of the ring gear R3 of the planetary gear set G to the counter shaft.

The hydraulic servo 7 of the clutch C-3 is formed by a cylinder 70 that is rotatably supported to the outer periphery of the forward boss portion 10a via a bush and that is radially expanded at an outer peripheral side thereof to form the drum 72, and a piston 71 that is slidably inserted in the cylinder 70, and a cancel plate 75 for offsetting the centrifugal hydraulic pressure occurring on the back surface of the piston 71, and a return spring 76. The supply of servo pressure to and removal of servo pressure from the hydraulic servo 7 is performed via an in-case fluid passage 10q formed in the forward boss portion 10a.

The friction member 63 of the clutch C-1 and the friction member 73 of the clutch C-3 are disposed side by side on the outer peripheral side of the speed-reducing planetary gear G1. The friction member 63 of the clutch C-1 is formed by separator plates and a multi-plate friction element splined at an inner peripheral side thereof to the hub 74 and splined at an outer peripheral side to the drum 62. A construction is designed so that torque is transmitted from the hub 74 to the drum 62 by clutch engagement achieved by the clamping of a backing plate fixed to a distal end of the drum 62 and the piston 61 forced out from the cylinder 60 upon supply of a hydraulic pressure into the hydraulic servo 6.

The friction member 73 of the clutch C-3 is formed by separator plates and a multi-plate friction element splined at an inner peripheral side thereof to the hub 74 and splined at an outer peripheral side to the drum 72. A construction is designed so that torque is transmitted from the hub 74 to the drum 72 by clutch engagement achieved by the clamping of a backing plate fixed to a distal end of the drum 72 and the piston 71 forced out from the cylinder 70 upon supply of a hydraulic pressure into the hydraulic servo 7.

The hydraulic servo 5 of the clutch C-2 is disposed rearward of the planetary gear set G, that is, in a rearmost portion of the speed change mechanism. The hydraulic servo 5 is formed by a cylinder 50 coupled at an inner peripheral side thereof to the flange 11b of the rearward portion 11B of the input shaft and radially expanded at an outer peripheral side thereof to form the drum 52, and a piston 51 contained in the cylinder 50, and a centrifugal hydraulic pressure cancel plate 55, and a return spring 56. The supply of hydraulic pressure to and removal of hydraulic pressure from the hydraulic servo 6 is performed via an in-case fluid passage 10t formed in the rearward boss portion 10b of the transmission case.

The friction member 53 of the clutch C-2 is formed by separator plates and a multi-plate friction element splined at an inner peripheral side thereof to the hub 54 and splined at an outer peripheral side to the drum 52, at a site that is rearward on the outer peripheral side of the planetary gear set G and that is not provided with a ring gear. A construction is designed so that torque is transmitted from the drum 52 to the hub 54 by clutch engagement achieved by the clamping of a backing plate fixed to a distal end of the drum 52 and the piston 51 forced out from the cylinder 50 upon supply of a hydraulic pressure into the hydraulic servo 5.

The brake B-1 is a hand brake constructed so that a brake band 83 thereof clamps the drum 72 of the clutch C-3. The hydraulic servo of the hand brake is omitted from illustrations in the drawings because the hydraulic servo extends in a tangential direction relative to the drum 72 at the same position as that of the brake band 83 in the directions of the axis.

The brake B-2 has a multi-plate construction as in other clutches. The friction member 93 of the brake B-2 is disposed forward on the outer peripheral side of the planetary gear set G. The hydraulic servo 9 of the brake B-2 is disposed on the rear end wall portion 10e of the case 10 on the outer peripheral side of the hydraulic servo 5 of the clutch C-2 in such a manner that the friction member 93 of the brake B-2 can be engaged via the outer side of the friction member 53 of the clutch C-2. The hydraulic servo 9 is disposed on a side of the one-way clutch F-1. The hydraulic servo 9 of the brake B-2 is provided in such a manner that the cylinder containing the piston 91 is disposed inside the rear end wall portion 10e of the transmission case 10. More specifically, the separator plates of the friction member 93 are supported at their outer periphery to the peripheral wall portion 10f of the case 10 by spline engagement so that the separator plates are stopped from rotating. Friction element discs are supported at their outer periphery to the brake hub by spline engagement so that the friction element discs are stopped from rotating. The hydraulic servo 9 has a construction in which the annular piston 91 is fitted in the cylinder defined by the peripheral wall portion 10f of the case 10, the rear end wall portion 10e, and an annular wall 10e' extending from the rear end wall portion 10e in a direction of the axis. An arrangement is designed so that an extended portion of the piston 91 extends via the outer periphery of the drum 52 of the clutch C-2 so as to face the friction member 93. A return spring 96 and its receiving portion 96' of the hydraulic servo 9 of the brake B-2 are disposed in spaces between the spline teeth 10g supporting the friction member 93 of the brake B-2.

With regard to support of the counter drive gear 19, the gear 19 is supported, via a bearing 12, to an outer periphery of a boss portion extending rearward from an inner periphery of the support wall 10C forming a member supporting the counter drive gear 19. The retainment of the support wall 10C to the case 10B is described above.

Figure 5:
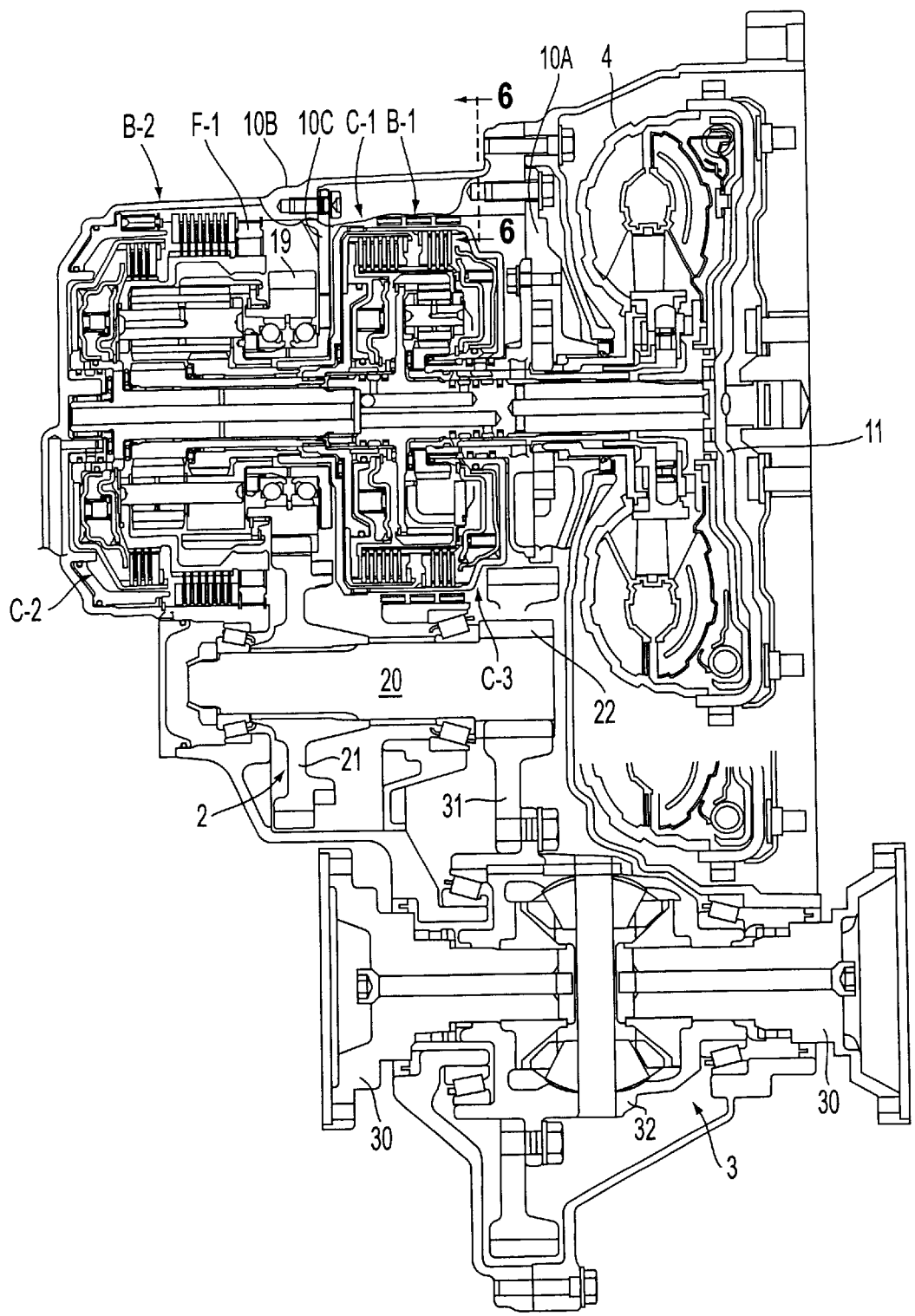
FIG. 5 is a sectional view of the overall construction of the transmission.

Corresponding to the input shaft 10 with the speed change mechanism arranged as described above, the differential drive pinion gear 22 meshed with the differential ring gear 31 of the differential device 3 is disposed on a forward end portion of the counter shaft 20 so as to overlap the case 10A in the directions of the axis in a form wherein the oil pump body is partially cut out, as can be seen from FIG. 5. Along with the foremost disposal of the differential drive pinion gear 22, a forward side of the counter shaft 20 is supported at a site rearward of the differential drive pinion gear 22 to the case 10B via a bearing. Based on this positional relationship, the hydraulic servo 7 of the clutch C-3 is disposed at a position that overlaps the differential ring gear 31 in radial directions, and the friction member 93 of the clutch C-3 is disposed so as to partially overlap the differential ring gear 31 in the directions of the axis at the outer peripheral side of the speed-reducing planetary gear G1.

As described above, the case construction of this embodiment allows the support wall 10C necessary for the speed change mechanism to be disposed within the case 10B and, at the same time, adopts integration of the rear case portion with the case 10B and thereby eliminates a protrusion of the joint portions in directions radially outward of the case. Therefore, it becomes possible to secure a valve body-disposing surface substantially throughout the entire length of the case 10B. Hence, restrictions of the area of the valve body can be eliminated. Furthermore, since the rear end of the case 10B is closed, the construction makes it possible to place the support wall 10C into the case while disposing the end surfaces 10i for fixing the support wall 10C, which is separate from the case 10B, to the case 10B and the end surfaces 10j for fixing the cover 10A for closing the case opening 10h to the case 10B, in portions having substantially equal diameters, by shifting the end surfaces 10i, 10j from one another in the circumferential directions relative to the case 10B. Furthermore, the aforementioned end surfaces 10i, 10j are formed by utilizing the end surfaces of the spline teeth 10g provided for the brake B-2 of the speed change mechanism. Further, the inter-teeth spaces between the spline teeth 10g are utilized as insert spaces for bringing the support wall 10C through the opening portion 10h. Therefore, it becomes possible to place the support wall 10C by utilizing the spaces needed for placing and supporting the friction member 93 of the brake B-2 of the speed change mechanism, thereby preventing a size increase of the case 10B for placement of the support wall 10C. Since it becomes unnecessary to expand the outside diameter of the opening portion side of the case 10B in order to place the support wall 10C, the outside diameter thereof can be reduced, so that not only the length in the directions of the axis of the case for disposal of the valve body but also an installation space can be secured. Still further, the support wall 10C is centered and positioned to the case 10B by fitting the annular protrusion 10n of the support wall 10C to the inner periphery of the spline teeth 10g of the case 10B, thereby achieving reliable concentricity of the counter drive gear 19 supported by the support wall 10C relative to the input shaft 11.

The invention has been described in detail with reference to the application thereof to the 6-speed speed change mechanism formed mainly of a Ravigneaux type gear set, in which good advantages are achieved. However, the invention is applicable to various automatic transmissions having different speed change mechanisms in which a support wall is needed in the transmission case, and thus, the invention is not restricted by the disclosed embodiment.

While the present invention has been described with reference to what is presently considered to be a preferred embodiment thereof, it is to be understood that the present invention is not limited to the disclosed embodiment or constructions. On the contrary, the present invention is intended to cover various modifications and equivalent arrangements.

What is claimed is:

1. A vehicular automatic transmission comprising:
   a case;
   a speed change mechanism disposed around an input shaft; and
   a gear that transmits an output of the speed change mechanism to a shaft extending along the input shaft; and
   a support wall, attached to the case, that supports the gear, wherein the case has, at one end of the case, a rear cover portion formed integrally with the case, and at another end of the case, an opening portion with a front cover closing the opening portion of the case, and the support wall, mounted between the rear cover portion and the opening portion of the case, is removable from the case via the opening portion.

2. The vehicular automatic transmission according to claim 1, wherein said case has, at the mounting position of the support wall and a position of the opening portion, end surfaces that face toward the opening portion and that are positionally shifted from each other in a circumferential direction.

3. The vehicular automatic transmission according to claim 2, wherein the support wall is provided with a protruded portion that can be moved past the end surface of the opening portion of the case and that contacts the end surface provided at the mounting position of the support wall of the case.

4. The vehicular automatic transmission according to claim 3, wherein the support wall is fixed to the case with the protruded portion set into contact with the end surface at the mounting position.

5. The vehicular automatic transmission according to claim 4, wherein the front cover is placed in contact with the end surface of the opening portion and fixed to the end surface to cover the opening portion.

6. The vehicular automatic transmission according to claim 1, wherein the case has spline teeth that extend in an inner periphery of a peripheral wall of the case in a direction of an axis thereof so as to support a friction member of a brake of the speed change mechanism in such a manner that the friction member is stopped from turning.

7. The vehicular automatic transmission according to claim 6, wherein the spline teeth include first spline teeth that terminate at a mounting position of the support wall and second spline teeth longer than the first spline teeth that extend to and terminate at the opening portion of the case.

8. The vehicular automatic transmission according to claim 7, wherein the support wall has an outside diameter portion whose diameter is smaller than a diameter of an inner periphery defined by the second spline teeth.

9. The vehicular automatic transmission according to claim 8, wherein the support wall has a protruded portion that protrudes from the outside diameter portion so that the protruded portion can pass through a space between the second spline teeth and can contact an end surface of at least one of the first spline teeth.

10. The vehicular automatic transmission according to claim 9, wherein the support wall is fixed to the case and the protruded portion stopped by the end surface of the at least one of the first spline teeth.

11. The vehicular automatic transmission according to claim 10, wherein the front cover is stopped by and fixed to an end surface of at least one of the second spline teeth to cover the opening portion.

12. The vehicular automatic transmission according to claim 11, wherein the support wall has an annular protrusion that fits to an inner periphery defined by the spline teeth of the case.

13. The vehicular automatic transmission according to claim 1, wherein the case has, at the mounting position of the support wall and a position of the opening portion, end surfaces that face toward the opening portion and that are positionally shifted from each other in a circumferential direction and having substantially equal diameters.

* * * * *